United States Patent
Isono et al.

(10) Patent No.: US 9,494,163 B2
(45) Date of Patent: Nov. 15, 2016

(54) TURBOCHARGER

(71) Applicant: IHI Corporation, Tokyo (JP)

(72) Inventors: Yuusuke Isono, Tokyo (JP); Kazuaki Iwata, Tokyo (JP); Atsushi Mori, Tokyo (JP)

(73) Assignee: IHI Corporation, Tokyo (JP)

( * ) Notice: Subject to any disclaimer, the term of this patent is extended or adjusted under 35 U.S.C. 154(b) by 593 days.

(21) Appl. No.: 14/072,290

(22) Filed: Nov. 5, 2013

(65) Prior Publication Data

US 2014/0140814 A1 May 22, 2014

(30) Foreign Application Priority Data

Nov. 21, 2012 (JP) ................ 2012-254942

(51) Int. Cl.
F04D 27/00 (2006.01)
F01D 17/10 (2006.01)
F01D 17/16 (2006.01)
(Continued)

(52) U.S. Cl.
CPC ............ F04D 27/009 (2013.01); F01D 9/026 (2013.01); F01D 17/105 (2013.01); F01D 17/165 (2013.01); F02B 37/16 (2013.01); F02C 6/12 (2013.01); F02M 26/06 (2016.02); F04D 27/0215 (2013.01)

(58) Field of Classification Search
CPC ............ F04D 27/009; F04D 27/0215; F04D 27/0238; F01D 9/026; F01D 17/105; F01D 17/165; F02C 6/12; F02B 37/16; F02M 26/06; F02M 26/19; F02M 29/09; F05D 2220/40; Y02T 10/144
See application file for complete search history.

(56) References Cited

U.S. PATENT DOCUMENTS 3,462,071 A * 8/1969 Garve ............ F02B 33/00
123/559.1
5,236,301 A * 8/1993 Palmer ............ F04D 29/4213
415/116

(Continued)

FOREIGN PATENT DOCUMENTS

CN  1573058 A  2/2005
CN  101285417 A  10/2008
(Continued)

OTHER PUBLICATIONS

Combined Chinese Office Action and Search Report issued Sep. 2, 2015 in Patent Application No. 201310582446.5 (with English Translation).

Primary Examiner — Igor Kershteyn
(74) Attorney, Agent, or Firm — Oblon, McClelland, Maier & Neustadt, L.L.P.

(57) ABSTRACT

A turbocharger includes: a suction passage into which a fluid is sucked from outside of a compressor housing; an outlet passage that guides the fluid, which is sucked through the suction passage and compressed, to the outside of the compressor housing; an opening portion formed in a wall surface of the compressor housing and serving as an opening of the suction passage; a return passage which makes the outlet passage and the suction passage communicate with each other through the opening portion, thereby returning the compressed fluid from the outlet passage to the suction passage; and an air bypass valve which opens and closes the opening portion. A level of a bottom surface of the return passage located on a vertically lower side therein declines from the outlet passage toward the suction passage without ever rising.

5 Claims, 3 Drawing Sheets

(51) Int. Cl.
    *F02B 37/16*    (2006.01)
    *F02C 6/12*     (2006.01)
    *F01D 9/02*     (2006.01)
    *F04D 27/02*    (2006.01)

(56) References Cited

U.S. PATENT DOCUMENTS

| | | | | |
|---|---|---|---|---|
| 8,161,745 B2* | 4/2012 | Dorle | ................ | F01D 9/026 60/605.1 |
| 8,511,083 B2* | 8/2013 | Arnold | ................ | F04D 27/0207 60/598 |
| 8,517,664 B2* | 8/2013 | Sun | ................ | F02B 47/08 415/126 |
| 8,522,549 B2* | 9/2013 | Sumser | ................ | F04D 29/685 415/205 |
| 2001/0028839 A1* | 10/2001 | Nakao | ................ | F04D 29/4213 415/1 |

FOREIGN PATENT DOCUMENTS

| | | |
|---|---|---|
| CN | 102762838 A | 10/2012 |
| CN | 103154466 A | 6/2013 |
| JP | 5-163954 | 6/1993 |
| WO | WO 2012/030776 A2 | 3/2012 |

\* cited by examiner

TURBOCHARGER

BACKGROUND OF THE INVENTION

1. Field of the Invention

The present invention relates to a turbocharger including a compressor housing which is provided with a return passage for returning part of compressed air to an upstream side.

2. Description of the Related Art

There has been known a turbocharger including a bearing housing configured to rotatably hold a turbine shaft that is provided with a turbine wheel (turbine impeller) on one end and a compressor wheel (compressor impeller) provided on the other end. The turbocharger is connected to an engine and the turbine wheel is rotated by exhaust gas discharged from the engine. The rotation of the turbine wheel rotates the compressor wheel via the turbine shaft.

The turbocharger compresses air with the rotation of the compressor wheel and sends the compressed air to the engine. In a vehicle or the like equipped with a turbocharger, when throttle valves in the engine are closed for deceleration, a boost pressure rises whereas a flow rate of air drops, so that the turbocharger may cause a surge and noise. To address this, as disclosed in Japanese Patent Application Laid-Open Publication No. 05-163954, there has been a widely used configuration of a compressor housing provided with a return passage making upstream and downstream sides of a compressor wheel communicate with each other, the return passage configured to be opened and closed by an air bypass valve. The employment of the configuration makes it possible to avoid a surge by opening the air bypass valve and returning part of the compressed air to the upstream side of the compressor wheel when the boost pressure rises.

SUMMARY OF THE INVENTION

In the above configuration provided with the return passage, droplets of moisture contained in the air, blow-by oil and the like may stay in the return passage. In this case, in a cold area, it is likely that a sufficient amount of air cannot be returned to the upstream side because the droplets staying in the return passage get frozen and thereby narrow the return passage, for instance.

Furthermore, residue remaining in the return passage may become viscous through evaporation of the moisture. When the viscous residue sticks between the air bypass valve and the seat surface, the residue may hinder the air bypass valve from being opened and closed normally. Against this background, there has been a demand for development of a turbocharger which prevents droplets from staying in a return passage.

An object of the present invention is to provide a turbocharger which is capable of preventing droplets from staying in a return passage provided in a compressor housing.

An aspect of the present invention provides a turbocharger which includes: a compressor housing which houses a compressor wheel; a suction passage which is provided in the compressor housing and into which a fluid is sucked from outside of the compressor housing by rotation of the compressor wheel; an outlet passage provided in the compressor housing and configured to guide the fluid, sucked through the suction passage and compressed by the compressor wheel, to the outside of the compressor housing; an opening portion formed in a wall surface of the compressor housing and serving as an opening of the suction passage; a return passage making the outlet passage and the suction passage communicate with each other through the opening portion, and configured to return the compressed fluid from the outlet passage to the suction passage; and an air bypass valve configured to open and close the opening portion. Here, the return passage includes a bottom surface which is located on a vertically lower side in the return passage when the opening portion is located in a position higher in a vertical direction than the suction passage. Moreover, the bottom surface is formed in a way that a level of the bottom surface declines from the outlet passage toward the suction passage without ever rising.

The present invention makes it possible to prevent droplets from staying in a return passage provided in a compressor housing.

DETAILED DESCRIPTION OF THE EMBODIMENT

Referring to the accompanying drawings, descriptions will be hereinbelow provided for a preferred embodiment of the present invention. Dimensions, materials, specific values and the like shown in the embodiment are provided just as examples for facilitating understanding of the invention, and are not intended to limit the present invention unless otherwise specified. In the specification and drawings, components having substantially the same functions and configurations will be denoted by the same reference signs and duplicated explanations will thus be omitted. Meanwhile, illustration of components not directly related to the present invention is omitted.

Figure 1:
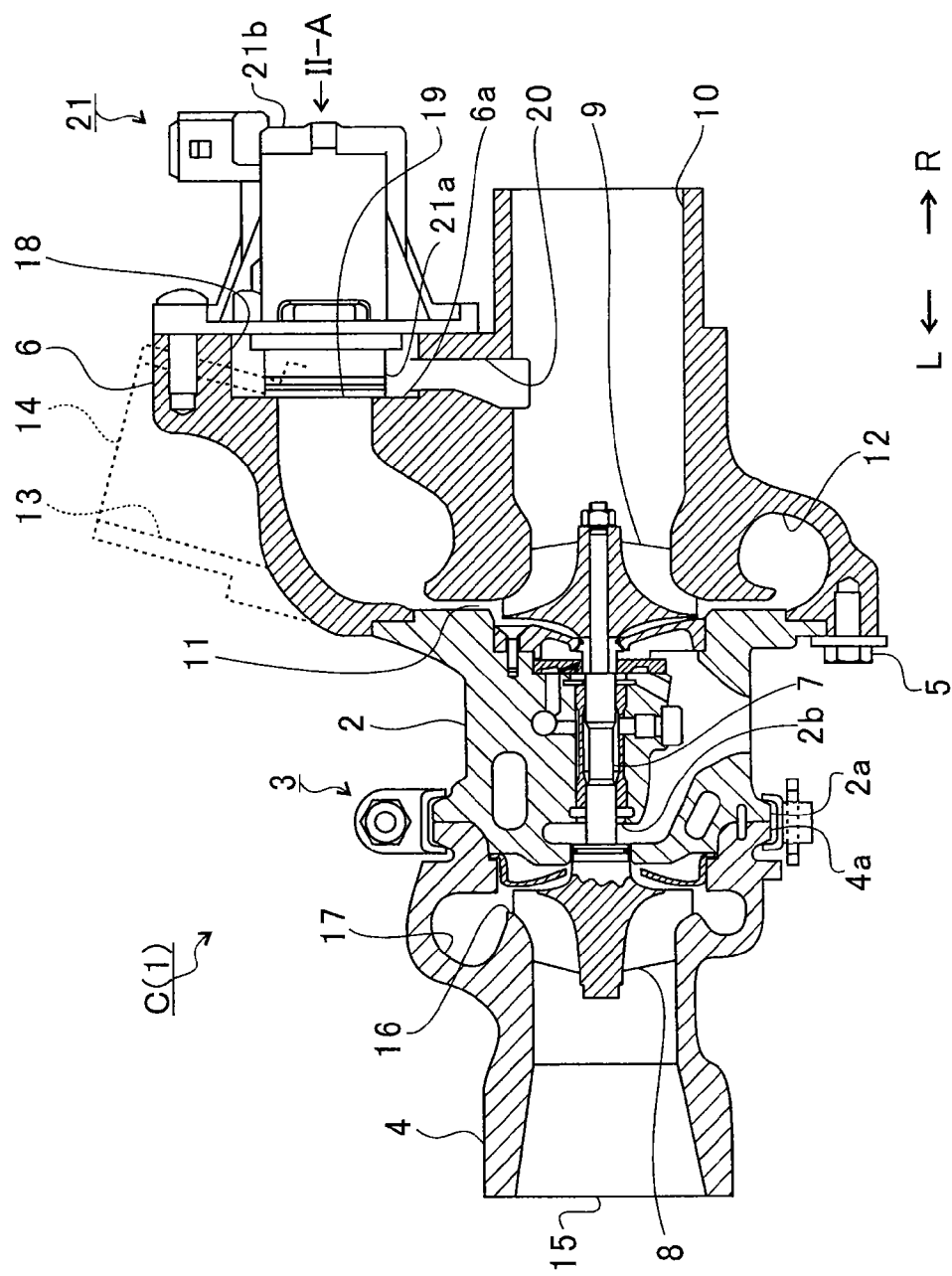
FIG. 1 is a schematic cross-sectional view of a turbocharger of an embodiment of the present invention.

FIG. 1 is a schematic cross-sectional view of a turbocharger C. The following descriptions will be provided on the assumption that a direction indicated with an arrow L in FIG. 1 is a left side of the turbocharger C while a direction indicated with an arrow R therein is a right side of the turbocharger C. As shown in FIG. 1, the turbocharger C includes a turbocharger main body 1. This turbocharger main body 1 is formed by integration of the following components, namely, a bearing housing 2, a turbine housing 4 connected to the left side of the bearing housing 2 by use of a fastening mechanism 3, and a compressor housing 6 connected to the right side of the bearing housing 2 by use of a fastening bolt 5.

A protrusion 2a jutting out in a radial direction of the bearing housing 2 is provided on an outer peripheral surface of the bearing housing 2 in the vicinity of the turbine housing 4. In addition, a protrusion 4a jutting out in a radial direction of the turbine housing 4 is provided on an outer peripheral surface of the turbine housing 4 in the vicinity of the bearing housing 2. The bearing housing 2 and the turbine housing 4 are fixed to each other by the fastening mechanism 3 that fastens the protrusions 2a, 4a using a band. The fastening mechanism 3 is formed from a fastening band (G coupling) configured to clamp the protrusions 2a, 4a.

A bearing hole 2*b* penetrating through the bearing housing 2 in the left-right direction of the turbocharger C (in the axial direction of a turbine shaft 7) is formed in the bearing housing 2. The turbine shaft 7 is rotatably supported by a bearing housed in the bearing hole 2*b*. A turbine wheel (turbine impeller) 8 is integrally fixed to a left end portion (one end) of the turbine shaft 7, and is rotatably housed in the turbine housing 4. In addition, a compressor wheel (compressor impeller) 9 is integrally fixed to a right end portion (opposite end) of the turbine shaft 7, and is rotatably housed in the compressor housing 6.

A suction passage 10 to be connected to an air cleaner, albeit not illustrated, is formed in the compressor housing 6 with an end portion of the suction passage 10 opened to the right side of the turbocharger C. Furthermore, when the bearing housing 2 and the compressor housing 6 are connected together by use of the fastening bolt 5, a diffuser passage 11 configured to raise the pressure of a fluid (air) is defined by opposing surfaces of the two housings 2, 6. This diffuser passage 11 is shaped like a ring, extending from its inside toward outside in the radial direction of the turbine shaft 7 (the compressor wheel 9). In the inside in the radial direction thereof, the diffuser passage 11 communicates with the suction passage 10 through the compressor wheel 9.

Moreover, the compressor housing 6 is provided with a ring-shaped compressor scroll passage 12 which is located further outward in the radial direction of the turbine shaft 7 (the compressor wheel 9) than the diffuser passage 11. The compressor scroll passage 12 communicates with an intake port of an engine, albeit not illustrated, and with the diffuser passage 11 as well. For this reason, when the compressor wheel 9 rotates, the fluid is sucked into the suction passage 10 from the outside of the compressor housing 6. Thereafter, the pressure of the sucked fluid is raised in the diffuser passage 11 and the compressor scroll passage 12, and the fluid is guided to the outside of the compressor housing 6 while passing through an outlet passage 13 and an outlet port 14. Thus, the fluid is discharged to the intake port of the engine, which is continuously provided to the discharge port 14.

A discharge port 15 opened to the left side of the turbocharger C and connected to an exhaust emission control system, albeit not illustrated, is formed in the turbine housing 4. The turbine housing 4 is further provided with a passage 16, and a ring-shaped turbine scroll passage 17 located further outward in the radial direction of the turbine shaft 7 (the turbine wheel 8) than the passage 16. The turbine scroll passage 17 communicates with: a gas inlet port, albeit not illustrated, to which exhaust gas discharged from an exhaust manifold of the engine is guided; and the passage 16 as well. For this reason, the exhaust gas guided from the gas inlet port to the turbine scroll passage 17 is guided to the discharge port 15 through the passage 16 and the turbine wheel 8, and rotates the turbine wheel 8 in its flowing process. The rotational force of the turbine wheel 8 is transmitted to the compressor wheel 9 by means of the turbine shaft 7. As described above, the rotational force of the compressor wheel 9 raises the pressure of the fluid and then guides the fluid to the intake port of the engine.

Meanwhile, once the throttle valves of the engine are closed, noise is more likely to occur because the boost pressure of the compressor housing 6 rises and a surge occurs accordingly. With this taken into consideration, the compressor housing 6 is provided with a mechanism configured to return part of the compressed air to the upstream side.

To put it specifically, in the turbocharger main body 1, a hole 18 is provided in the compressor housing 6 from the right side of the turbocharger main body 1. A wall surface 6*a* of the compressor housing 6 located in the bottom surface of the hole 18 is provided with an opening portion 19 serving as an opening of the outlet passage 13, apart from the outlet port 14 continuously provided to the intake port of the engine.

A return passage 20 is formed between the opening portion 19 (the hole 18) and the suction passage 10. The return passage 20 makes the outlet passage 13 and the suction passage 10 communicate with each other through the opening portion 19 and the hole 18, and thereby returns part of the compressed fluid from the outlet passage 13 to the suction passage 10.

An air bypass valve 21 is an electrically-operated valve configured to open and close the opening portion 19, for example, on the basis of a measured value of the boost pressure, a control condition of the engine, and the like. A valve body 21*a* of the air bypass valve 21 is placed in a way that enables the valve body 21*a* to come into contact with a seat surface in the wall surface 6*a* of the compressor housing 6, the seat surface being located in the vicinity of the circumference of the opening portion 19. An actuator 21*b* closes the opening portion 19 by operating the valve body 21*a* and bringing the valve body 21*a* into contact with the seat surface, and opens the opening portion 19 by moving the valve body 21*a* away from the seat surface.

Although the foregoing descriptions have been provided for the case where the air bypass valve 21 is the electrically-operated valve, the air bypass valve 21 may be a mechanical valve configured to be opened and closed in accordance with the operation of a diaphragm in response to a difference in pressure between the outlet passage 13 and the suction passage 10.

When the boost pressure becomes too high, part of the compressed fluid is returned to the upstream side of the compressor wheel 9 by opening the air bypass valve 21. Thus a surge can be avoided.

Nevertheless, when droplets of moisture, blow-by oil and the like contained in the compressed fluid stay in the return passage 20, the staying droplets may get frozen in a cold area. In this case, the return passage 20 is more likely to become narrower. Furthermore, if residue of the droplets after the evaporation of the moisture is viscous, the residue firmly sticks between the valve body 21*a* of the air bypass valve 21 and the seat surface. In this case, the residue may hinder the air bypass valve 21 from being opened and closed normally.

With these cases taken into consideration, in the embodiment, the return passage 20 is formed as described below in order to avoid the stay of the droplets therein.

Figure 2A:
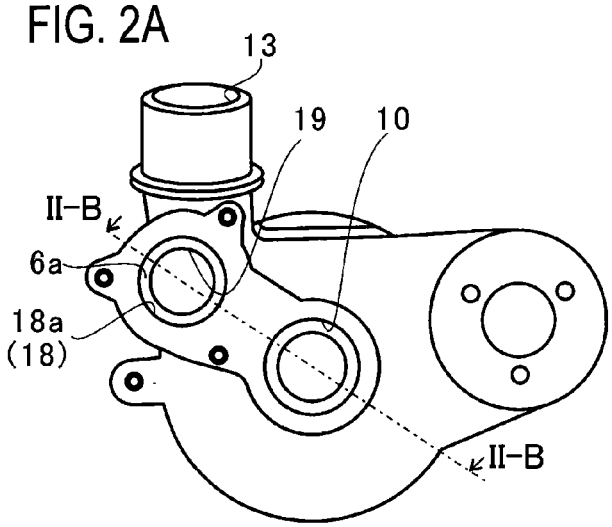
FIGS. 2A to 2C are explanatory diagrams for explaining a return passage in a compressor housing of the embodiment of the present invention.
Figure 2B:
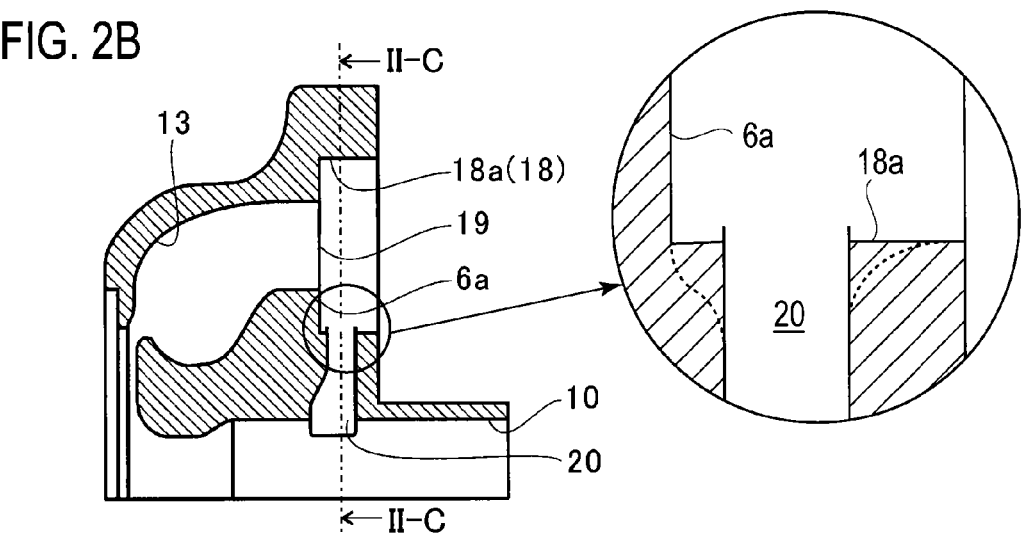
Figure 2C:
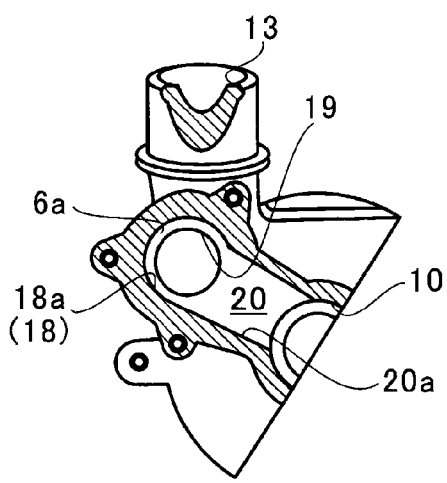

FIGS. 2A to 2C are explanatory diagrams for explaining the return passage 20 in the compressor housing 6. FIG. 2A is a view of the compressor housing 6 as viewed in a direction indicated with an arrow IIA in FIG. 1. FIG. 2B is a cross-sectional view of the compressor housing 6 taken along the IIB-IIB line of FIG. 2A. FIG. 2C is a cross-sectional view of the compressor housing 6 taken along the IIC-IIC of FIG. 2B. It should be noted that: the air bypass valve is not depicted in FIG. 2A; and FIGS. 2B and 2C show only the outlet passage 13 side of the compressor housing 6 beyond the center of the suction passage 10.

The turbocharger C is installed in a vehicle or the like, for example, in a direction that: the upper portion of the turbocharger C in FIGS. 2A and 2C is located on a vertically upper side; and the lower portion of the turbocharger C is located on a vertically lower side. When the turbocharger C is installed in a vehicle or the like in the orientation shown in FIG. 2A, that is to say, while the turbocharger C is in use, the opening portion 19 is located further upward in the vertical direction (the top-bottom direction in FIG. 2A) than the suction passage 10. In other words, the opening portion 19 is located in a position higher in the vertical direction than the suction passage 10.

In addition, as shown in FIG. 2C, the return passage 20 has a bottom surface 20a which is located on a vertically lower side when the opening portion 19 is located in the position higher in the vertical direction than the suction passage 10. The bottom surface 20a is formed in a way that its level continuously declines from the outlet passage 13 toward the suction passage 10 without ever rising. Here, the bottom surface 20a of the return passage 20 is formed in parallel with the flowing direction of the fluid which flows in the return passage 20. In other words, the bottom surface 20a is formed from a single flat surface.

Moreover, as shown in FIG. 2C, the external shape of the wall surface 6a located in the bottom surface of the hole 18 in the compressor housing 6 is round, and the bottom surface 20a extends in a direction tangential to the circle which represents the external shape of the wall surface 6a. It should be noted that as indicated with dotted lines in a partially enlarged view of FIG. 2B, a side surface 18a of the hole 18 may be formed to be smoothly joined to the wall surface 6a and the bottom surface 20a. In other words, the side surface 18a may be formed in a way that: a tangential plane of the side surface 18a becomes progressively parallel to (finally coincides with) the wall surface 6a as the tangent becomes closer to the wall surface 6a, and that the tangent becomes progressively parallel to (finally coincides with) the bottom surface 20a as the tangent becomes closer to the bottom surface 20a. In this case, it is possible to inhibit droplets from staying in the vicinity of the boundary between the wall surface 6a and the side surface 18a, and in the vicinity of the edge end of the opening portion of the hole 18 even when the turbocharger C is tilted either clockwise or counterclockwise in FIG. 1.

As described above, the bottom surface 20a of the return passage 20 is designed to decline continuously. This design eliminates irregularities on the return passage 20 where droplets would stay, thereby preventing the droplets from staying in the return passage 20. Accordingly, the droplets flow into the suction passage 10 through the return passage 20 without staying in the return passage 20.

Since the droplets are inhibited from staying in the return passage 20, the return passage 20 will no longer be narrowed due to the frozen droplets, or the valve body 21a of the air bypass valve 21 will no longer be inhibited from being opened and closed normally due to the residue caused by the evaporation of the moisture in the droplets.

In particular, since the bottom surface 20a of the return passage 20 is shaped like a straight line, the droplets easily flow into the suction passage 10 and become less likely to stay in the return passage 20. In addition, a process of forming the return passage 20 becomes easier.

In addition, the bottom surface 20a of the return passage 20 extends in the direction tangential to the external shape of the wall surface 6a. As a consequence, the droplets are more likely to be guided to the return passage 20 through the side surface 18a of the hole 18 located adjacent to exterior of the wall surface 6a.

What is more, in the embodiment, the inclination of the bottom surface 20a of the return passage 20 to the horizontal plane is set at a value larger than, for example, a maximum angle of inclination that the vehicle or the like with the turbocharger C installed therein is assumed to lean while the vehicle or the like is running. In other words, the bottom surface 20a is inclined in the direction that the suction passage 10 is located lower than the opening portion 19 even when the vehicle leans to the maximum. For this reason, it is possible to prevent the droplets from staying irrespective of the driving condition of the vehicle.

Figure 3A:
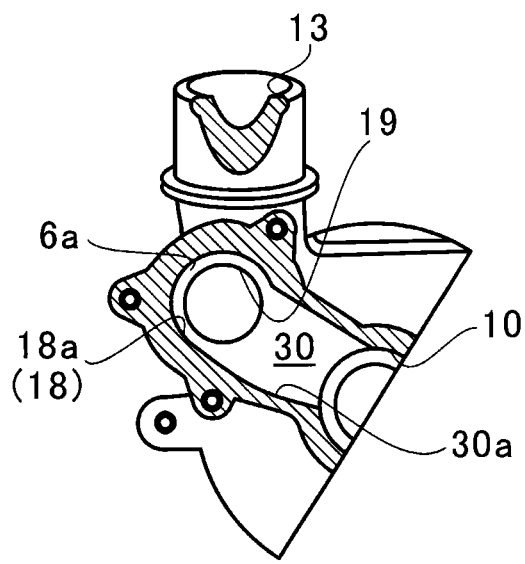
FIGS. 3A and 3B are explanatory diagrams for explaining return passages in modifications of the embodiment of the present invention.
Figure 3B:
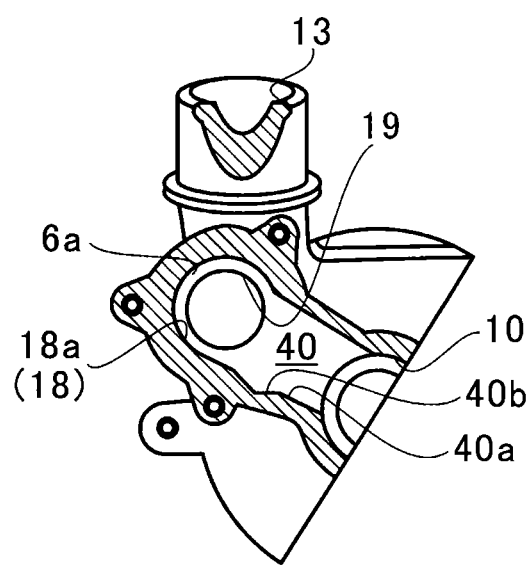

FIGS. 3A and 3B are explanatory diagrams for explaining return passages 30, 40 of modifications, and show cross-sectional views of parts of the return passages 30, 40 of the modifications which correspond to the part of the return passage 20 shown in FIG. 2C. Like in FIGS. 2A and 2C, the top-bottom direction in FIGS. 3A and 3B correspond to the vertical direction.

In a first modification shown in FIG. 3A, the level of a bottom surface 30a located on a vertically lower side in the return passage 30 continuously declines from the outlet passage 13 toward the suction passage 10 without ever rising as in the foregoing embodiment. Unlike the bottom surface 20a of the foregoing embodiment, however, the bottom surface 30a of the return passage 30 is formed into a curved shape. In other words, the bottom surface 30a is continuously formed from a curved surface. For this reason, the bottom surface 30a makes the droplets less likely to stay in the return passage 30 than in the case where projections and a flat portion to be described below are formed in the bottom surface 30a.

Furthermore, in the case where the bottom surface 30a is formed as the curved surface as in the first modification, the inclination of the tangent to any point on the curve defining the bottom surface 30a shown in FIG. 3A is set at a value larger than a maximum angle of inclination that the vehicle or the like loading the turbocharger C is assumed to lean while the vehicle or the like is running, and the direction of inclination of the tangent is set at a direction opposite to the direction of the inclination of the vehicle or the like. Thus, it is possible to prevent the droplets from staying irrespective of the driving condition of the vehicle, as is the case in the above-described embodiment.

In a second modification shown in FIG. 3B, the level of a bottom surface 40a located on the vertically lower side in the return passage 40 does not rise at all in a region from the outlet passage 13 toward the suction passage 10, as in the foregoing embodiment. Unlike in the bottom surface 20a of the foregoing embodiment, however, the level of the bottom surface 40a does not continuously decline. Instead, a flat portion 40b formed as a flat surface is additionally provided to the bottom surface 40a. In other words, the level of the bottom surface 40a declines stepwise. To put it specifically, the flat portion 40b makes the level of the bottom surface 40a decline stepwise.

The inclination of the flat portion 40b is set at a value larger than the maximum angle of inclination that the vehicle or the like loading the turbocharger C is assumed to lean while the vehicle or the like is running, and the direction of inclination of the flat portion 40b is set at a direction opposite to the direction of the inclination of the vehicle or the like. In other words, as shown in FIG. 3B, even when the vehicle or the like leans to the maximum, the level of the flat portion 40b is kept horizontal. Even though the bottom surface 40a declines stepwise as described above, the bottom surface does not rise at all. As a consequence, the droplets are less likely to stay in the return passage 40 than in the case where projections and the like are formed on the bottom surface 40a.

The foregoing descriptions have been provided for the case of providing the flat portion 40b to be kept horizontal. However, the flat portion 40b is not an essential component and does not necessarily have to be provided.

Although the foregoing descriptions have been provided for the preferred embodiment of the present invention while referring to the accompanying drawings, it goes without saying that the present invention is not limited to the embodiment. It is obvious to those skilled in the art that various modified and altered examples can be arrived at within the scope of claims, and it shall be naturally understood that such modified and altered examples are also encompassed by the technical scope of the present invention.

What is claimed is:

1. A turbocharger comprising:
    a compressor housing which houses a compressor wheel;
    a suction passage provided in the compressor housing and into which a fluid is sucked from outside of the compressor housing by rotation of the compressor wheel;
    an outlet passage provided in the compressor housing and configured to guide the fluid, sucked through the suction passage and compressed by the compressor wheel, to the outside of the compressor housing;
    an opening portion formed in a wall surface of the compressor housing and serving as an opening of the suction passage;
    a return passage making the outlet passage and the suction passage communicate with each other through the opening portion, and configured to return the compressed fluid from the outlet passage to the suction passage; and
    an air bypass valve configured to open and close the opening portion, wherein
    the return passage includes a bottom surface which is located on a vertically lower side in the return passage when the opening portion is located in a position higher in a vertical direction than the suction passage, and
    the bottom surface is formed in a way that a level of the bottom surface declines from the outlet passage toward the suction passage without ever rising.

2. The turbocharger of claim 1, wherein the bottom surface is formed from a single flat surface.

3. The turbocharger of claim 1, wherein the bottom surface is formed from a curved surface.

4. The turbocharger of claim 1, wherein a level of the bottom surface declines stepwise.

5. The turbocharger of claim 4, wherein the bottom surface includes a flat portion which makes the level of the bottom surface decline stepwise.

* * * * *